United States Patent [19]

Andrä et al.

[11] Patent Number: 4,779,483
[45] Date of Patent: Oct. 25, 1988

[54] TORSIONAL VIBRATION DAMPER

[75] Inventors: Rainer Andrä, Limburg; Bernhard Röhrig, Heppenheim; Günter Ullrich, Hemsbach, all of Fed. Rep. of Germany

[73] Assignee: Firma Carl Freudenberg, Weinheim an der Bergstrasse, Fed. Rep. of Germany

[21] Appl. No.: 49,402

[22] Filed: May 14, 1987

[30] Foreign Application Priority Data

Sep. 5, 1986 [DE] Fed. Rep. of Germany ....... 3630308

[51] Int. Cl.$^4$ .................. F16F 15/10; G05G 1/00; G05G 3/00
[52] U.S. Cl. ............................... 74/574; 74/572
[58] Field of Search .................. 74/572, 573 R, 574

[56] References Cited

U.S. PATENT DOCUMENTS

| | | | |
|---|---|---|---|
| 2,594,555 | 4/1952 | Hardy | 74/574 |
| 2,597,747 | 5/1952 | Peirce | 74/574 |
| 2,659,244 | 11/1953 | Guy | 74/574 |
| 2,834,226 | 5/1958 | Hirst | 74/574 |
| 2,837,902 | 6/1958 | Stevens et al. | 74/574 |
| 3,023,593 | 3/1962 | Nallinger | 74/574 |
| 3,036,445 | 5/1962 | Hein | 74/574 |
| 3,062,072 | 11/1962 | Hirst | 74/574 |
| 3,385,082 | 5/1968 | Deuring et al. | 74/574 |
| 3,477,311 | 11/1969 | McGreary | 74/574 |
| 3,730,013 | 5/1973 | Slemmons | 74/574 |
| 4,516,955 | 5/1985 | Worner et al. | 74/574 |

FOREIGN PATENT DOCUMENTS 322113 5/1957 Switzerland .................. 74/574

Primary Examiner—Gary L. Smith
Assistant Examiner—Vinh Luong
Attorney, Agent, or Firm—Felfe & Lynch

[57] ABSTRACT

A torsional vibration damper comprising a hub ring (2) surrounded by a flyring (1), the two being united by at least one resilient member and being angularly displaceable relative to each other, the resilient member (3, 4) being of columnar shape and extending in the radial direction, and a clearance (6) being provided next to the resilient member in the circumferential direction between the hub ring and the flyring. The resilient member comprises a radially inner first resilient element (3) and a radially outer second resilient element (4). The ends facing each other of the first and second resilient elements (3, 4) are fastened on the inside and outside to one end (5) of a one-armed lever (7) which projects into the clearance (6) between the hub ring and flyring. The other end (8) of the lever (7) is adapted to be caused by the centrifugal force generated at a particular speed of rotation to bear undislodgeably and with deformation of the first and second resilient elements (3, 4) on the opposite facing flyring surface (9) which outwardly bounds the clearance (6) to effect an uncoupling of the spring action of the second resilient element (4) from that of the first resilient element (3).

9 Claims, 1 Drawing Sheet

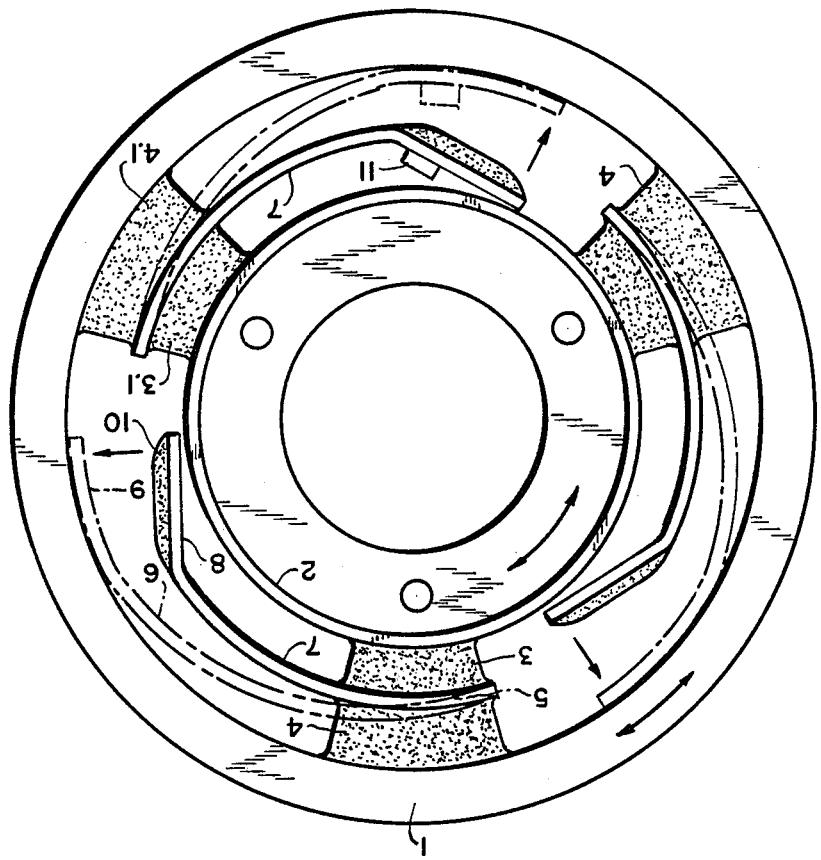

TORSIONAL VIBRATION DAMPER

BACKGROUND OF THE INVENTION

The invention relates to a torsional vibration damper comprising a hub ring surrounded by a flyring, the two being united by at least one resilient member and being angularly displaceable relative to each other, the resilient member being of columnar shape and extending in the radial direction, and a clearance being provided next to the resilient member in the circumferential direction between the hub ring and the flyring.

A torsional vibration damper of this type is known from German published patent application No. 33 34 393. The damping of torsional vibrations achieved with this device is based on the utilization of absorption effects. At resonance, the device is extraordinarily effective; but its effectiveness is limited to this one case. Vibrations in a different frequency range are not damped, or only poorly damped. This torsional vibration damper is therefore useful only where unwanted vibrations of a single frequency range can occur.

In an attempt to utilize the absorption effect in a self-contained torsional vibration damper for damping resonant vibrations of different frequency regions, it has already been proposed to use a plurality of flywheel masses which are elastically coupled to the hub or to one another. In this case, the individual flywheel systems are coordinated so that each is optimally designed for the damping of unwanted vibrations in a different frequency range. Such a multi-frequency torsional vibration damper is disclosed in the German design Pat. No. 19 97 151.

Thus, depending upon the frequency range of the vibrations introduced, one or the other of the incorporated flywheel systems is alternately activated and alone engaged to damp the disturbing vibrations. However, the presence of the other systems, and particularly of the inertial masses which they comprise, not only detracts from the effectiveness of the damper but also accounts for its considerable weight and high manufacturing cost. There is therefore a need for a resonant vibration damper for rotary motion that does not include such drawbacks.

SUMMARY OF THE INVENTION

A principal objective of the present invention is to provide a resonant, torsional vibration damper which permits unwanted vibrations of different frequency ranges to be damped by means of a single inertial mass.

In accordance with the invention, this, as well as other objectives which will become apparent from the discussion that follows, are achieved with a torsional vibration damper of the type described above, wherein the resilient member comprises a radially inner first resilient element and a radially outer second resilient element; wherein the facing ends of the first and second resilient elements are fastened on the inside and outside to one end of a one-armed lever which projects into the clearance between the hub ring and flyring; and wherein the other end of the lever is adapted to be caused by the centrifugal force generated at a particular speed of rotation to bear undislodgeably, and with deformation of the first and second resilient elements, on the opposite, facing surface of the flyring which outwardly bounds the clearance to effect an uncoupling of the spring action of the second resilient element from that of the first resilient element.

The reasoning underlying the invention is that, with torsional vibrations, there is always a definite relationship between the frequency of an unwanted vibration and the speed of rotation of a shaft.

The speed of rotation can therefore be utilized for the identification and selective damping of an unwanted vibration which, in accordance with the invention, is done by utilizing the speed-dependent centrifugal force to bypass the second resilient element through a coupling when a threshold value is exceeded. Consequently, when still higher speeds of rotation are attained, the spring action of the first resilient element alone is effective.

The cushioning of the inertial mass contained in the flyring thus becomes firmer after a desired speed of rotation has been reached, which results in a different resonant frequency even though there has been no change whatever in the inertial mass. The absorption effect of the torsional vibration damper of the invention is therefore effective in two distinct frequency ranges. These can be readily coordinated with the frequency ranges of two different unwanted vibrations by use of the formula $$\omega_o = \sqrt{\frac{c}{m}}$$

where c denotes the variable cushioning and m the invariable mass of the flyring. The two different unwanted vibrations are therefore damped equally by utilization of the absorption effect.

In the transition region between the first and second resonant frequencies, frictional forces having a beneficial effect will come into play until the second resilient element is rigidly bypassed. This is conducive to a gradual transition of the damping action from the effectiveness of the first resonant frequency to the range of the second resonant frequency. The respective effect is augmented by the deformation of the two resilient elements which occurs in the inventive torsional vibration damper with increasing speed of rotation as a result of the displacement of the free end of the lever due to the centrifugal force.

Modified embodiments of the inventive torsional vibration damper in which a third, fourth, fifth and so forth resilient elements corresponding in design and function to the second resilient element are successively bypassed as the speed of rotation increases further are readily feasible and will permit absorption-induced damping effects to be achieved in additional frequency ranges. The torsional vibration damper of the invention then lends itself to potential applications of considerable complexity. It should be noted that in these cases, too, it offers the advantage that a single flyring will suffice. The inventive torsional vibration damper can thus be manufactured at very low cost and is of low weight.

The resilient elements may have differing spring stiffnesses to permit the two resonant frequencies to be spaced far apart.

The resilient elements may be designed and produced in any desired manner. They are advantageously made of rubber-elastic materials which are adhesively bonded to the adjacent machine components by vulcanization.

In one advantageous embodiment, the other end of the lever is provided with a friction facing on the surface which is directed outwardly in the radial direction. In addition or in the alternative, the opposite, facing surface on the flyring is also provided with a friction facing. This is conducive to good operative engagement in bypassing the second resilient element.

The friction facings of this type may also consist of rubber-elastic materials and may optionally be molded on together with the resilient elements. The manufacturing process then is considerably simplified. Moreover, it then becomes possible to mold a domelike protuberance onto the end of the lever and/or the opposite flyring surface so as to provide for a smooth transition in the damping action between the various frequency ranges.

The frequency ranges over which the inventive torsional vibration damper exhibits optimal damping action can be shifted by modifying the spring stiffness of the resilient elements. Moreover, the cut-off frequency at which each second resilient element is bypassed by the motion of the respective lever due to the centrifugal force can be changed by attaching inertial masses to the free ends of one or more levers. In this way, the torsional vibration damper of the invention can be adapted to widely differing requirements.

BRIEF DESCRIPTION OF THE DRAWING

The single FIGURE is an elevational view of a torsional vibration damper according to the present invention.

DESCRIPTION OF THE PREFERRED EMBODIMENT

A preferred embodiment of the torsional vibration damper of the invention is shown by way of example in the accompanying drawing and will now be described in detail.

The torsional vibration damper illustrated consists of a hub ring 2 and of a flyring 1, of which the latter surrounds the former in a spaced relationship, and which are united and adapted for relative angular motion by three columnar resilient members that are uniformly distributed around the device. The resilient members are divided in the transverse direction by an interposed lever 7 and thereby comprise an inner resilient element 3 and an outer resilient element 4. The latter advantageously has a lower spring stiffness than the inner resilient element 3.

Both resilient elements are made of rubber with a hardness of 65 on the Shore A scale. The greater resilience of the outer resilient element 4 is due to its larger dimension in the radial direction.

The resilient elements 3 and 4 are fastened by vulcanization to the outer surface of the hub ring 2, to opposite surfaces of the end 5 of the lever 7 which penetrates into the resilient member, and to the inner surface of the flyring 1.

The lever 7 is fabricated from sheet steel and projects from the resilient member into the clearance which is adjacent to it in the circumferential direction between the hub ring and the flyring. The end portion 8 of the lever 7 is bent inwardly, that portion being provided on its outside with a friction facing 10 of rubber.

The principle of operation of the torsional vibration damper is as follows:

At low speeds of rotation, the lever 7 is approximately in the position shown so that the resilient elements 3 and 4 connect the hub ring 2 and the flyring 1 in a series arrangement. Since the outer resilient element 4 has greater resilience than the inner resilient element 3, the resulting resonant frequency is determined by its resilience and the mass of the flyring 1 alone.

With increasing speed of rotation, the projecting end 8 of the lever 7 moves increasingly outward in the radial direction, which results in deformation of the resilient elements 3 and 4 relative to each other. The spring stiffness of the outer resilient element is thus increased and the resonant frequency is therefore shifted into a higher range.

As the speed of rotation keeps increasing, the projecting end 8 of the lever 7 is increasingly in frictional contact with the opposite surface 9 of the flyring 1. This frictional contact is tantamount to a further reduction in the resilience of the resilient element 4, which is therefore increasingly supplanted by the mobility of the relatively harder resilient element 3. The resonant frequency of the torsional vibration damper thus undergoes a corresponding shift to a higher frequency range. The maximum is finally reached at a speed of rotation at which the relative mobility of the resilient element 4 is completely blocked by the lever 7 as its end 8 bears firmly against the opposite surface 9.

It has been found that, as a rule, it will be advantageous to fabricate all levers and resilient elements of the torsional vibration damper in the identical manner. Unbalance is thereby reliably prevented.

In the embodiment illustrated, one of the levers is provided with a separate inertial mass 11, in contrast to the usual design. As a result, the associated outer resilient element 4.1 is bypassed at a lower speed of rotation than the other outer resilient elements 4. Instead of the relatively softer outer resilient element 4.1 effective before, the relatively harder inner resilient element 3.1 will then be in parallel with the other outer resilient elements 4. The frequency range in which a resonance effect is obtained is thus broadened.

It is apparent that with appropriate coordination of further resilient elements and levers, and depending upon their number, the frequency range can be expanded at will so that a broad-band damping action is obtained over any desired frequency range.

There has thus been shown and described a novel torsional vibration damper which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claims which follow.

What is claimed is:

1. In a torsional vibration damper comprising a hub ring surrounded by a flyring, the two being united by at least one resilient member and being angularly displaceable relative to each other by spring action of the resilient member, the resilient member being of columnar shape and extending in the radial directon from hub ring to flyring, with a clearance being provided next to the resilient member in the circumferential direction between the hub ring and flyring, the improvement wherein the resilient member comprises a radially inner first resilient element and a radially outer second resilient element, each having two ends; wherein the ends facing each other of the first and second resilient elements are fastened, respectively, to one end of one-armed lever which projects into the clearance between the hub ring and flyring; and wherein the other end of the lever is adapted to be caused by the centrifugal force generated at a particular speed of rotation to bear outwardly against an opposed, inwardly facing surface on the flyring which outwardly bounds the clearance, thereby effecting an uncoupling of the spring action of the second resilient element.

2. The torsional vibration damper according to claim 1, wherein the spring stiffness of the first resilient element differs from that of the second resilient element.

3. The torsional vibration damper according to claim 1, wherein the spring stiffness of the first resilient element is higher than that of the second resilient element.

4. The torsional vibration damper according to claim 1, wherein at least one of the first and the second resilient elements consists of a rubber-elastic material.

5. The torsional vibration damper according to claim 1, wherein the free end of the lever is provided on its surface directed outwardly in the radial direction with a friction facing.

6. The torsional vibration damper according to claim 5, wherein the friction facing consists of a rubber-elastic material.

7. The torsional vibration damper according to claim 1, wherein the inner flyring surface opposite the free end of the lever is provided with a friction facing.

8. The torsional vibration damper according to claim 7, wherein the friction facing consists of a rubber-elastic material.

9. The torsional vibration damper according to claim 1, wherein the free end of the lever is loaded with an inertial mass.

* * * * *